US012811697B2

(12) United States Patent
Cohen et al.

(10) Patent No.: US 12,811,697 B2
(45) Date of Patent: Nov. 24, 2026

(54) FREE SPACE CONFIGURABLE OPTIC LINKS FOR CHIP STACKING

(71) Applicant: International Business Machines Corporation, Armonk, NY (US)

(72) Inventors: Guy Moshe Cohen, Westchester, NY (US); Takashi Ando, Eastchester, NY (US); Nanbo Gong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 18/928,518

(22) Filed: Oct. 28, 2024

(65) Prior Publication Data

US 2026/0121767 A1 Apr. 30, 2026

(51) Int. Cl.

| | |
|---|---|
| ***H04B 10/00*** | (2013.01) |
| ***G02B 26/08*** | (2006.01) |
| ***H04B 10/80*** | (2013.01) |
| *H04J 14/00* | (2006.01) |

(52) U.S. Cl.

CPC ....... *H04B 10/803* (2013.01); *G02B 26/0833* (2013.01)

(58) Field of Classification Search

CPC .... H04B 10/80; H04B 10/801; H04B 10/802; H04B 10/803

See application file for complete search history.

(56) References Cited

U.S. PATENT DOCUMENTS

| | | | | |
|---|---|---|---|---|
| 8,818,196 | B2 * | 8/2014 | Davidson | H04B 10/1149 398/118 |
| 10,649,303 | B2 | 5/2020 | Joo et al. | |
| 10,700,779 | B1 | 6/2020 | Panas | |
| 10,845,555 | B2 | 11/2020 | Fini et al. | |
| 11,196,486 | B2 | 12/2021 | Hosseini et al. | |
| 11,678,090 | B2 | 6/2023 | Saunders et al. | |
| 11,789,334 | B2 | 10/2023 | Lai et al. | |

(Continued)

OTHER PUBLICATIONS

"400 W 905 nm Multi-Junction VCSEL Array M53-100", Lumentum, retrieved from web https://www.lumentum.com/en/products/400-w-905-nm-multi-junction-vcsel-array, dated Feb. 11, 2025, 5 pages.

(Continued)

*Primary Examiner* — Daniel G Dobson

(74) *Attorney, Agent, or Firm* — Scully, Scott, Murphy & Presser, P.C.; Kristofer Haggerty

(57) ABSTRACT

A semiconductor package including a plurality of optical chips, the chips having an optical transmitter and optical receiver mounted on each chip and configured for chip-to-chip communications. A beam steering element is coupled to each optical transmitter to change a direction of a transmitted optical beam to enable communication between a chip and any other chip in the semiconductor package wherein an optical link can be optimally established between any of two chips using the beam steering element. The optical transmitter includes a VCSEL element. The beam steering element is a configurable meta surface or a MEMS structure. A method is implemented for establishing a network of optical links using a plurality of optical chips on a board. The chip-to-chip alignment is optimized by finding a set of steering beam parameters that optimizes the optical power received at the optical receiver at a receiving chip.

20 Claims, 8 Drawing Sheets

(56) References Cited

U.S. PATENT DOCUMENTS

| | | | | |
|---|---|---|---|---|
| 11,996,886 | B2 | 5/2024 | Erkmen et al. | |
| 12,015,440 | B2 | 6/2024 | Chan et al. | |
| 2014/0067742 | A1 | 3/2014 | Katayama et al. | |
| 2022/0244360 | A1 | 8/2022 | Phare et al. | |
| 2023/0236472 | A1* | 7/2023 | Moriguchi | G01S 7/481 359/298 |
| 2023/0314701 | A1 | 10/2023 | Libsch et al. | |
| 2023/0393357 | A1 | 12/2023 | Ranno et al. | |
| 2024/0004046 | A1 | 1/2024 | Menezo | |
| 2024/0080123 | A1 | 3/2024 | Lee et al. | |
| 2024/0322933 | A1* | 9/2024 | Rofougaran | H04B 10/1149 |

OTHER PUBLICATIONS

"Elevator", Wikipedia, retrieved from web dated Feb. 11, 2025, 45 pages.

Berini Pierre. "Optical Beam Steering Using Tunable Metasurfaces", ACS Photonics, Jan. 24, 2024, pp. 2204-2218.

Kern et al. "Single-Fiber Bidirectional Optical Data Links with Monolithic Transceiver Chips", Advances in Optical Technologies, Feb. 27, 2012, 8 pages, vol. 2012, Article ID 729731.

King et al. "2D VCSEL arrays for chip-level optical interconnects", Proc. SPIE 3632, Optoelectronic Interconnects VI, Apr. 13, 1999, 11 pages.

Krishnamoorthy et al., "16 × 16 VCSEL array flip-chip bonded to CMOS VLSI circuit", IEEE Photonics Technology Letters, Aug. 2000, 3 pages, vol. 12, No. 8.

Li et al. "Excitonic Beam Steering in an Active van der Waals Metasurface", Nanoletters, Mar. 15, 2023, pp. 2771-2777, vol. 23, Issue No. 7.

Milanizadeh et al. "Establishing Multiple Chip-to-Chip Orthogonal Free-Space Optical Channels using Programmable Silicon Photonics Meshes", IEEE Photonics Society Summer Topicals Meeting Series (SUM), 2022, 2 pages.

Savidis et al. "Heterogeneous 3-D circuits: Integrating free-space optics with CMOS", Microelectronics Journal, Apr. 2016, pp. 66-75, vol. 50.

Wang et al. "High-Speed Reconfigurable Free-Space Card-to-Card Optical Interconnects", IEEE Photonics Journal, Oct. 2012, pp. 1407-1419, vol. 4, No. 5.

Xue et al. "An Intra-Chip Free-Space Optical Interconnect", ACM SIGARCH Computer Architecture News, Jun. 19, 2010, pp. 94-105, vol. 38, Issue 3.

* cited by examiner

FREE SPACE CONFIGURABLE OPTIC LINKS FOR CHIP STACKING

BACKGROUND

This disclosure relates generally to semiconductor chips and chip packaging, and more specifically to semiconductor chips and chip stacks having optical links for communicating between chips and further methods for optical communications on chip stacks.

Currently, optical fibers and optical links and waveguide structures have been integrated to form photonic integrated circuits (ICs) or integrated optical circuits. Integration of multiple photonic ICs to provide inter-chip optical communications in IC packages however, can be problematic. For example, a limitation is the requirement of precise alignment and precise mounting of optical structures (e.g., on the order of 1 μm tolerance). Further, a data communications network configuration is fixed (i.e., what chip talks to what chip cannot be changed during operation). Further, each chip can usually talk to few other chips due to limited number of optical links per chip.

Further, while current implementations of stacked memory chips can reduce read/write time and energy, the efficiencies are not scalable as the increased layers of memory chips in the stack requires additional interconnect structures requiring much needed chip real estate. That is, stacking chips dilutes the overall memory density since large portion of the chip area must be used for interconnect.

SUMMARY

Embodiments of the present disclosure provide a semiconductor package with multiple integrated optical circuits or photonic ICs that provide free space optics with optical beam steering.

In the embodiments of the present disclosure, in such semiconductor packages providing free space optics with beam steering, each photonic IC includes an optical signal receiver and an optical signal transmitter.

In an aspect, for any chip-to-chip communication of a semiconductor package, optimal beam steering parameters are utilized to ensure alignment of optical beams for maximized power of the received optical signal.

Further, a configuration of a network on the chip package can change on the fly as each chip can talk to any other chip and beam steering can be implemented by a configurable metasurface or MEMS elements.

Thus, in an aspect, according to the present disclosure, photonic IC packaging limitations can be relaxed as beam steering can compensate for misalignment of parts.

According to an aspect of the present disclosure, there is provided an apparatus. The apparatus comprises a plurality of optical integrated circuits (IC) disposed on a support substrate, each optical IC having an optical transmitter and an optical receiver, the optical transmitter configured to transmit an optical signal; a beam steering element coupled to the optical transmitter and configurable to change a direction of a transmitted optical signal; a structure facing the plurality of optical ICs providing a light reflective surface; the beam steering element directing a transmitted optical signal from a first optical IC towards the reflective surface in a direction that is reflected at the light reflective surface for receipt at an optical receiver at any one of the plurality of optical ICs.

According to a further aspect, there is provided an apparatus. The apparatus comprises: a first support substrate supporting a first plurality of optical integrated circuits (IC); a second support substrate facing the first support substrate, the second support substrate supporting a second plurality of optical integrated circuits (IC), each optical IC of the first plurality and second plurality of optical ICs having an optical transmitter and an optical receiver, the optical transmitter configured to transmit an optical signal; a beam steering element coupled to the optical transmitter of each optical IC of the first plurality and second plurality of optical ICs and configurable to change a direction of a transmitted optical signal, the beam steering directing a transmitted optical signal from a first optical IC of the first plurality of optical ICs for receipt at an optical receiver at any one of the second plurality of optical ICs.

In a further embodiment, there is provided an apparatus. The apparatus comprises: multiple support substrates defining an enclosed space, each support substrate supporting a respective plurality of optical integrated circuits (IC), each optical IC of each the respective plurality of optical ICs having an optical transmitter and an optical receiver, the optical transmitter configured to transmit an optical signal; a beam steering element coupled to the optical transmitter of each optical IC of each the respective plurality of optical ICs and configurable to change a direction of a transmitted optical signal, the beam steering element directing a transmitted optical signal from a first optical IC of a first plurality of optical ICs for receipt at an optical receiver at any one of the respective plurality of optical ICs.

Further features, as well as the structure and operation of various embodiments, are described in detail below with reference to the accompanying drawings. In the drawings, like reference numbers indicate identical or functionally similar elements.

DETAILED DESCRIPTION

Figure 1:
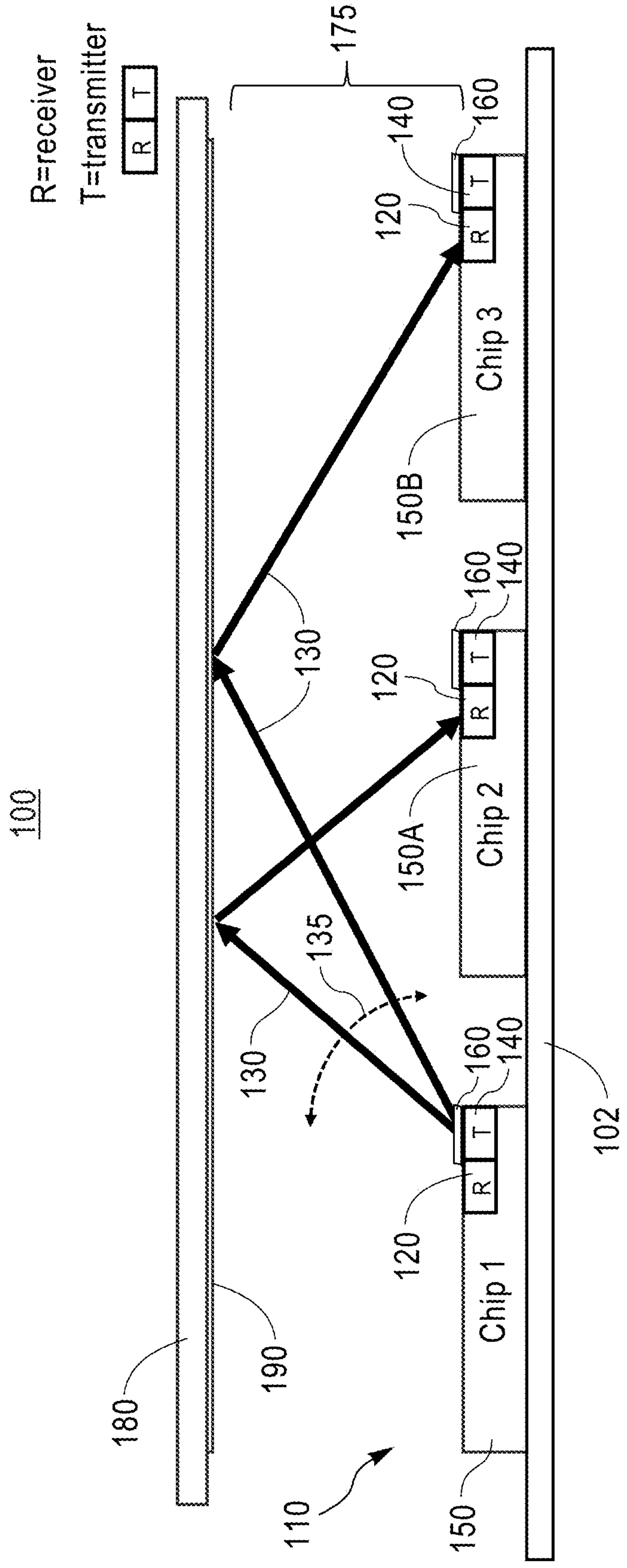
FIG. 1 shows a semiconductor chip package according to a first embodiment that includes a layout of photonic ICs that each include an optical receiver and an optical transmitter having a coupled beam steering element for generating and communicating optical signals that can be received at any other photonic IC within the package.

The present application will now be described in greater detail by referring to the following discussion and drawings that accompany the present application. It is noted that the drawings of the present application are provided for illustrative purposes only and, as such, the drawings are not drawn to scale. In addition, features described herein can be used in combination with other described features in each of the various possible combinations and permutations. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a", "an" and "the" include plural referents unless otherwise specified, and that the terms "includes", "comprises", and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath", "directly under", or "in contact with" another element, there are no intervening elements present.

Embodiments herein provide a system comprised of a plurality of photonic integrated circuits (ICs) or optical integrated circuits that include an optical transmitter and optical receiver mounted on each chip. In a non-limiting embodiment, the optical transmitter includes a vertical-cavity surface-emitting laser (VCSEL) array connected to drive circuitry for operating VCSELS to generate light signals (e.g., optical beams) at one or more VCSEL transmitters, and the optical receiver includes a photodiode, phototransistor or like light energy sensor configured for receiving optical beams. Further, each optical IC chip includes a beam steering element coupled to each optical transmitter. The system establishes optical links between any of two chips of the plurality of optical IC chips using the beam steering element.

In an embodiment, the beam steering element is a configurable electromagnetic or optical metasurface which is composed of a planar surface or a sheet of a material with sub-wavelength features that are reconfigurable to engineer their light properties, such as amplitude, phase, and polarization, for independent or simultaneous manipulation of electromagnetic (EM) and light waves as well as the temporal and spatial response in the spectrum. In an embodiment, the beam steering element is a configurable electromagnetic metasurface. The configurable metasurface including an array of optical elements, each of the elements and the spacing between the elements is of sub-wavelength dimension. The optical properties of each element are tunable. For example, it is possible to tune the refractive index or the absorption of light of each element. As in a phase array antenna, the operation of the optical metasurface includes manipulation of the light based on scattering from the sub-wavelength elements. These elements resonantly capture the light and re-emit it with a defined phase, polarization, modality and spectrum, thus allowing the sculpting of light waves with unprecedented accuracy (as referred to in Neshev, D., Aharonovich, I. entitled "Optical metasurfaces: new generation building blocks for multi-functional optics"; Light Sci Appl 7, 58 (2018).

In an alternate embodiment, the beam steering element can be a micro-electromechanical system (MEMS) or a microscopic device that is coupled to the optical transmitter and incorporates both electronic and moving parts than can be programmed to steer the optical beam produced by a coupled optical transmitter. As an example, a MEMS element can be a moving mirror which is driven by an electric field that controls the optical deflection angle.

In the present disclosure, a system or apparatus includes a plurality of optical integrated circuits (IC) disposed on a support substrate, with each optical IC having a VCSEL optical transmitter and an optical receiver disposed at a surface thereof. A beam steering element is coupled to the optical transmitter and configurable to change a direction of a transmitted optical signal. In an embodiment, the apparatus includes a structure providing a light reflective surface that is disposed above and/or faces the plurality of optical ICs. Thus, in this embodiment, the beam steering element is programmable to direct a transmitted optical signal from a first optical IC towards the reflective surface in a direction that is reflected at said light reflective surface for receipt at an optical receiver at any other optical IC of the plurality of optical ICs.

Referring to FIG. 1, there is illustrated a portion of a system or apparatus (e.g., a semiconductor chip package) 100 that include multiple integrated optical circuits (optical or photonic ICs) 150 that each include an optical transmitter with beam steering capability according to an aspect of the present disclosure.

In FIG. 1, the semiconductor chip package 100 includes a substrate 102, e.g., a printed circuit board (PCB), a laminate or an interposed structure that includes a two-dimensional (2-D) layout or 2-D array 110 of photonic ICs 150 that each include an optical receiver component 120 for receiving optical signals or an optical beam(s) 130 and an optical transmitter 140 having a coupled beam steering element for generating and communicating optical signals (optical beam(s)) 130 that can be received at other photonic ICs within the package. ICs 150 may also contain memory and/or processing circuits such as a central processing unit, (CPU) or graphic processing unit (GPU). The photonic portion of the IC 150 may be bonded on the memory or CPU/GPU or it may be monolithically integrated as part of the IC fabrication. The photonic portion of the IC (120, 140 and 160) provide the chip (memory and/or CPU/GPU) the capability of optically communicating with other ICs.

In the semiconductor chip package 100 of FIG. 1, disposed above the substrate 102 and 2-D array 110 of photonic ICs is a fixed 2-D substrate or like sheet structure 180 having a light reflective surface 190 that faces the optical transmitters at the top surfaces of the optical chips 150 and separated therefrom by a defined space 175. The substrate or semiconductor structure 180 has a patterned light reflective surface 190 such as a mirror or other like substantially reflective light reflective material surface that is used to reflect the optical signals or beams 130 transmitted by optical transmitter of a photonic IC 150 that can be received by any targeted photonic IC in the same 2-D layout array 110. While the light reflective surface 190 of structure 180 is depicted as a sheet or planar structure, in alternate embodiments, the overlying light reflective surface can be a dome-shaped or semispherical-shaped or can be any other shape having a reflective surface. In this embodiment, the optical transmitter 140 is provided with beam steering capability, e.g., in the form of an EM metasurface structure 160 (or similarly, a MEMS device) coupled to the optical transmitter 140 at an optical IC that is configurable as a lens to precisely focus its transmitted optical beam 130 to a specific location at the light reflective surface 190 such that the transmitted optical beam 130 can be optimally received by an optical receiver 120 at any other optical IC 150. For example, as shown in FIG. 1, beam steering control metasurface element 160 coupled the optical transmitter at optical IC 150 is controlled to steer the transmitted optical beam 130 to the reflective surface 190 at an angle 135 such that the beam 130 can be reflected for receipt at an optical receiver 120 at an optical IC chip 150A or an optical receiver 120 at a different optical IC chip 150B of array 110.

In further embodiments herein, the defined space 175 can have ends (not shown) to encapsulate or enclose the space 175 in order to prevent particulates or other physical disturbances that can block a light. For example, the space 175 can be enclosed and or sealed and filled with an inert gas.

While the embodiment depicted in FIG. 1 shows the light reflective surface 190 of an overlaid sheet structure 180 at an underside surface and the array or horizontal linear layout or 2-D layout array 110 of photonic ICs 150 situated beneath the light reflective surface 190 of the substrate, embodiments contemplate an alternate configuration with the substrate 180 having a top reflective surface and the array of horizontal linear layout or 2-D layout array 110 of photonic ICs 150 disposed on a substrate situated above and overlying the light reflective surface of the substrate with optical transmitters of the photonic ICs 150 facing the underlying light reflective surface.

Further in the embodiment of FIG. 1, the beam steering element 160 can be a coupled metasurface, i.e., an electromagnetic (EM) metasurface or optical metasurface material structure formed on top or overlayed onto a surface of the optical transmitter, e.g., VCSEL 140. The optical metasurface can include non-volatile phase change memory material elements formed in a PCM material layer having a thickness that is dependent upon the wavelength of light and the type of PCM material and can range up to 100 nm thick and which can be programmed or otherwise configured using an input control signal, e.g., a voltage signal, e.g., to change its refractive index or its light absorption for deflecting at a predefined angle the optical beam produced by the coupled optical transmitter. The beam steering element can further be a substrate having a MEMS element, e.g., a cantilever mirror, that can also be programmed or otherwise configured using an input control signal, e.g., a voltage signal, e.g., to change its orientation for deflecting at a predefined angle the optical beam produced by the coupled optical transmitter.

In a further embodiment herein, a group or sub-set of photonic ICs 150 can be dedicated to provide optical links to form an integrated data communications network.

Figure 2:
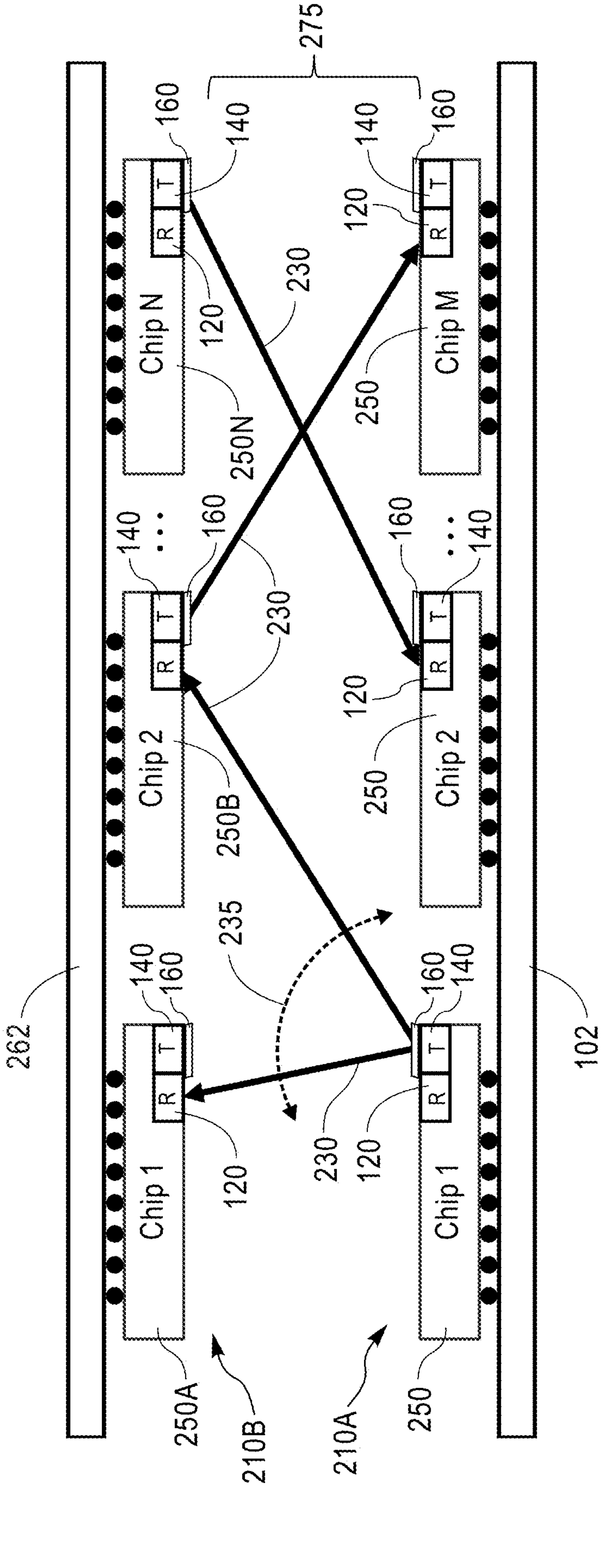
FIG. 2 shows a semiconductor chip package according to a second embodiment that includes a two-layered geometry with each layer including a layout of photonic ICs with photonic IC at a layer including an optical receiver and an optical transmitter having a coupled beam steering element for generating and communicating optical signals that can be received at any other photonic IC within the package.

FIG. 2 depicts a further embodiment of a semiconductor chip package 200 with a two-layered geometry including a first horizontal linear layout or 2-D layout array 210A of configured photonic ICs 250 mounted on a first substrate 202 using C4 or solder ball connections, and including an opposing second tier including a horizontal linear layout or 2-D layout array 210B of configured photonic ICs 250, e.g., labeled 250A, 250B, . . . , 250N in FIG. 2, mounted on a second substrate 262 using C4 or solder ball connections, the second substrate 262 overlaying the first substrate 202 with each of the photonic ICs 250 operable for chip-to-chip communication of optical beams 230 over a defined space 275 between the first layout 210A and second layout 210B. According to this embodiment, there are "M" optical ICs 250 on first tier 210A and "N" optical ICs 250A, 250B, . . . , 250N, on the second tier 210B that are enabled for chip-to-chip communications on opposing layers without the use of reflective surfaces. In non-limiting embodiments, N=M or N≠M.

In the chip package 200 of FIG. 2, each photonic IC 250, 250A, 250B, . . . , 250N, includes an optical transmitter provided with beam steering capability to precisely focus a transmitted optical beam 230 directly to an optical receiver of another photonic chip at the opposing layout or array. In the non-limiting, illustrative embodiment depicted in FIG. 2, the photonic ICs 250 of the first linear layout or 2-D layout array 210A of configured photonic ICs 250 are disposed beneath and in direct alignment with corresponding photonic ICs 250A, 250B, . . . 250N etc., of the second linear layout or 2-D layout array 210B of photonic ICs with the aligned photonic ICs of respective tiers having top surfaces directly facing each other. A photonic chip, e.g., chip 250 of the first layout or array 210A can directly communicate with a receiver 120 of a photonic chip, e.g., chip_250A, of the second layout or array 210B. However, in accordance with embodiments herein, the same photonic chip, e.g., chip 250 of the first layout or array 210A can directly communicate with a receiver of any other photonic chip, e.g., a photonic chip 250B of the second layout or array 210B. Generally, a photonic chip, e.g., chip 250 of the first layout or array 210A can directly communicate with any other photonic chip of the second layout or array 210 and vice versa, i.e., chip 250 of the second layout or array 210B can directly communicate with any other photonic chip of the first layout or array 210A.

In further embodiments (not shown), the photonic ICs 250 of the first linear layout or 2-D layout array 210A of a first tier or layer of configured photonic ICs 250 are disposed in a staggered arrangement where photonic IC of the second tier or 2-D layout array 210B of configured photonic ICs are not directly aligned with corresponding photonic ICs 250 of the first tier or array 210A. Notwithstanding the arrangement of photonic ICs on each tier, a photonic chip, e.g., chip 250 of the first layout or array 210A directly communicates with any other photonic chip of the second layout or array 210 and vice versa, i.e., chip 250 of the second layout or array 210B directly communicates with any other photonic chip of the first layout or array 210A As in the first embodiment, the photonic ICs 250 of the first horizontal linear layout or 2-D layout array 210A formed on the first substrate (e.g., PCB, laminate or interposer) 202 include an optical receiver 120 and optical transmitter 140 with the optical transmitter 140 coupled with a beam steering element 160 that can be configured to enable communication of optical beams 230 over the defined space 275 to optical receivers at any optical integrated circuit 250 of the second layout or array 210B of configured photonic ICs 250 formed on the second substrate 262 disposed a distance above the first substrate 202. Likewise, the photonic ICs 250 of the second layout or array 210B of configured photonic ICs 250 formed on the second substrate 262 include an optical receiver 120 and optical transmitter 140 that is coupled with a programmable beam steering element 160 that is configurable to enable communication of optical beams 230 over the defined space 275 with other the optical receivers at optical integrated circuits 250 of the first horizontal linear layout or 2-D layout array 210A formed on the first substrate 202. In embodiments herein, a group of photonic ICs 250 on first tier 210A and second tier 210B can be dedicated to form an integrated data communications network.

In further embodiments herein, the defined space 275 can have ends (not shown) to encapsulate or enclose the space 275 in order to prevent particulates or other physical disturbances that can block a light. For example, the space 275 can be sealed and filled with an inert gas.

In the embodiment depicted in FIG. 2, each programmable beam steering element 160 is in the form of an EM metasurface structure 160 (or MEMS device) coupled to the optical transmitter 140 at an optical IC that is configurable to precisely focus its transmitted optical beam 230 to a specific receiver at a specific chip on the opposing tier such that the transmitted optical beam 230 can be optimally received by an optical receiver 120 at any other optical IC 250. For example, as shown in FIG. 2, beam steering control metasurface element 160 coupled the optical transmitter at optical IC 250 at tier 210A is controlled to steer the transmitted optical beam 230 at an angle 235 for receipt at an optical receiver 120 at an optical IC chip 250A of tier 210B or an optical receiver 120 at a different optical IC chip 250B of array 210B.

Figure 3:
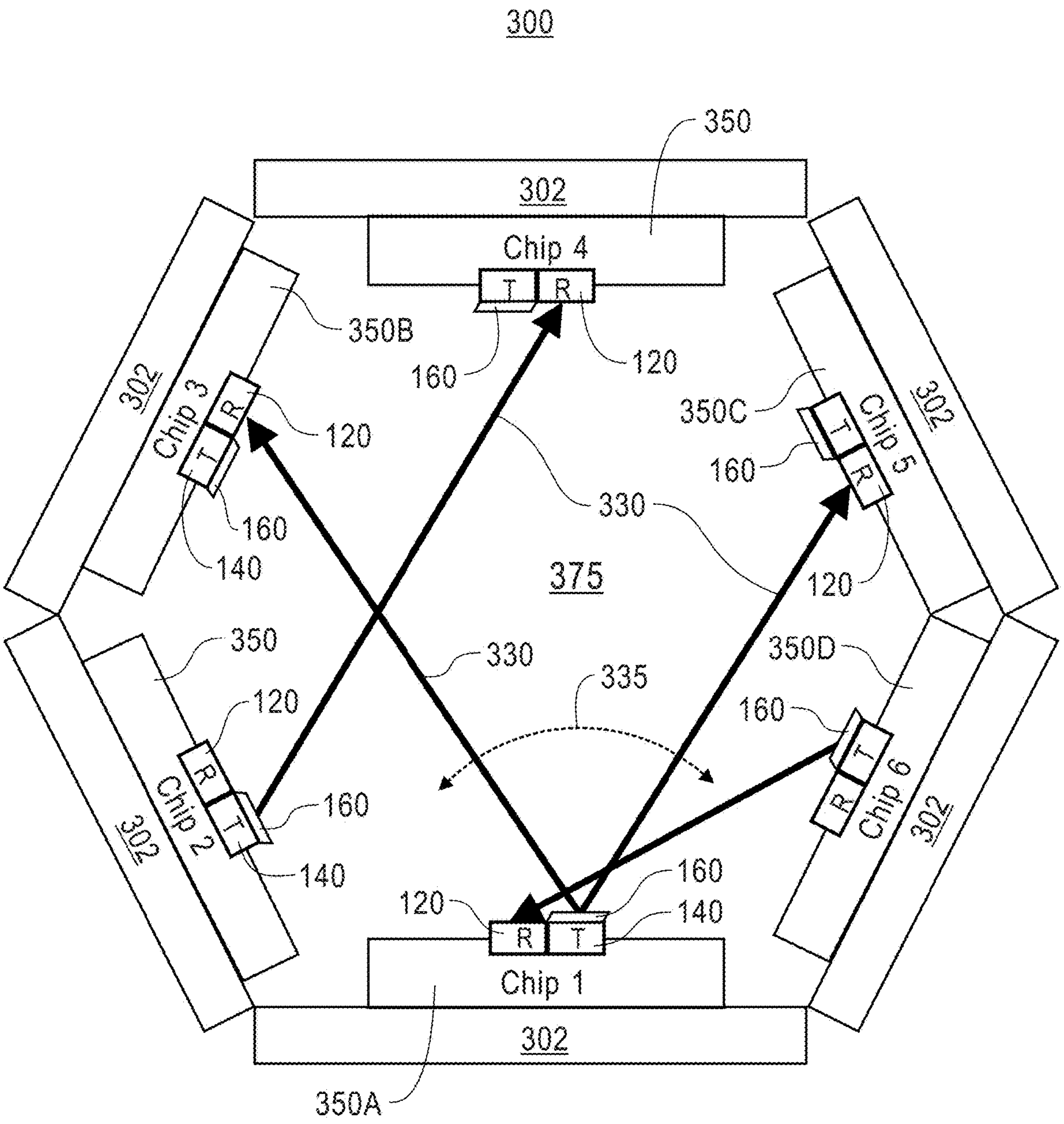
FIG. 3 shows a semiconductor chip package according to a third embodiment that includes a polygonal shaped enclosure having on each surface a photonic IC including an optical receiver and an optical transmitter having a coupled beam steering element for generating and communicating optical signals that can be received at any other photonic IC within the package.

FIG. 3 depicts a further embodiment of a semiconductor chip package 300 with free space optics forming a polygonal geometric structure, e.g., a pentagon, hexagon, octagon, etc. with one or more photonic ICs 350 disposed on surfaces of semiconductor substrates 302 arranged in the polygon. For example, in an illustrative, non-limiting embodiment shown in FIG. 3, a semiconductor package defines a polygonal configuration of substrates, e.g., arranged as a hexagon, defining an enclosed space 375, with each substrate 302 having a surface including one or more photonic ICs 350 disposed thereon and configured for communicating optical signal or optical beams 330 over the defined space 375 with any other photonic IC disposed on another substrate surface.

In the embodiment of FIG. 3, the photonic ICs include an optical transmitter provided with beam steering capability to precisely focus a transmitted optical beam 330 directly to an optical receiver of another chip at another substrate surface of the polygonal structure 300.

As in the other embodiments, the photonic ICs 350 of the formed on a first substrate (e.g., PCB, laminate or interposer) 302 include an optical receiver 120 and optical transmitter 140 with the optical transmitter 140 coupled with a beam steering element 160 that can be configured to enable communication of optical beams 330 over the defined space 375 to optical receivers at any other optical integrated circuit 350 formed in the package 300. In embodiments herein, a group of photonic ICs 250 on first tier 210A and second tier 210B can be dedicated to form an integrated data communications network.

In further embodiments herein, the defined space 375 can have ends (not shown) to encapsulate or enclose the space 375 in order to prevent particulates or other physical disturbances that can block a light. For example, the space 375 can be enclosed and filled with an inert gas.

In the embodiment depicted in FIG. 3, each programmable beam steering element 160 coupled to an optical transmitter 140 at an optical IC is in the form of an EM metasurface structure (or MEMS device) that is configurable to precisely focus its transmitted optical beam 330 to a specific receiver at a specific chip on another substrate such that the transmitted optical beam 330 can be optimally received by an optical receiver 120 at any other optical IC 350. For example, as shown in FIG. 3, beam steering control metasurface element 160 coupled to the optical transmitter 140 at optical IC 350A is controllable to steer the transmitted optical beam 330 at an angle 335 for receipt at an optical receiver 120 at an optical IC chip 350B or transmit beach 330 to an optical receiver 120 at a different optical IC chip 350C of the package 300.

In embodiments herein, a group of photonic ICs 350 in a polygonal shaped package can be dedicated to form an integrated data communications network.

Figure 4:
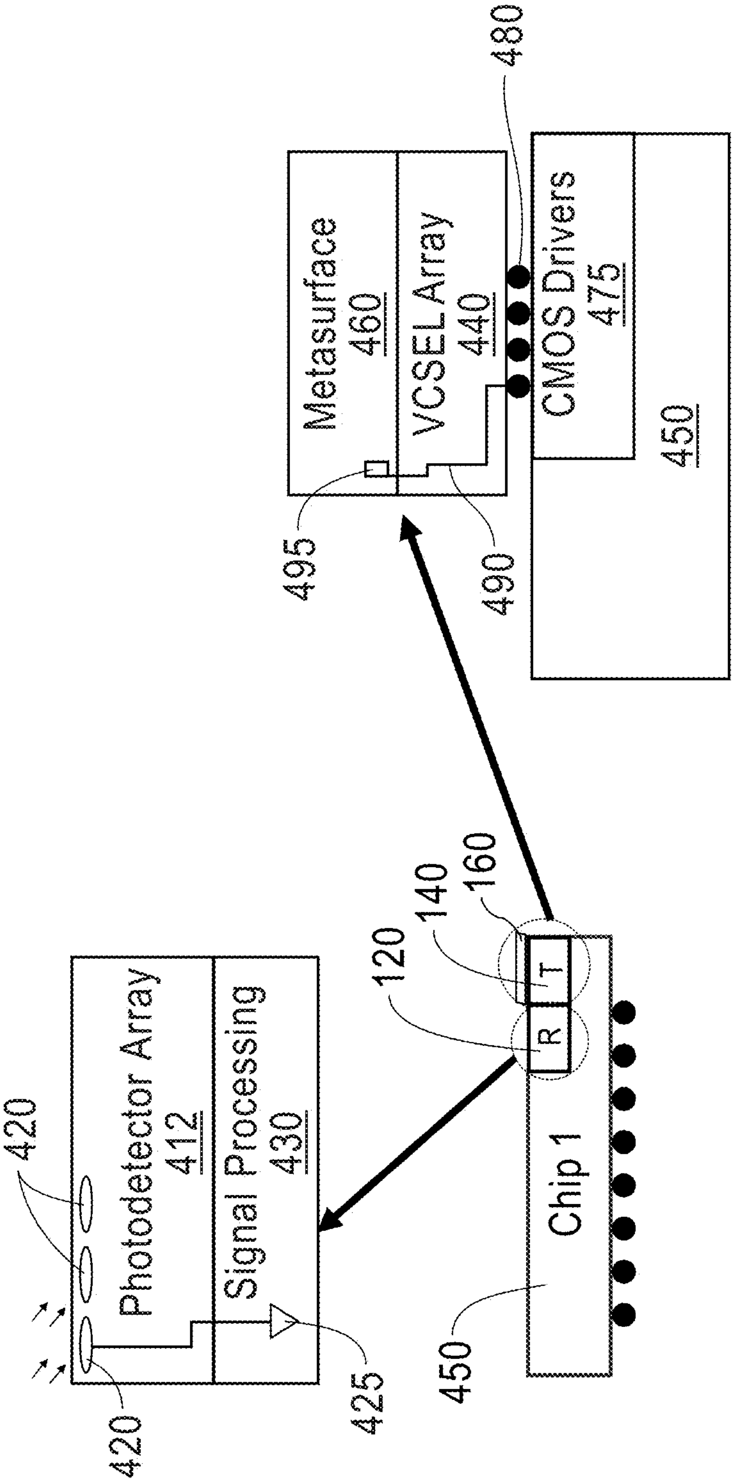
FIG. 4 shows a more detailed view of an optical chip having a VCSEL transmitter array operated to generate an optical signal or optical beam and that includes a coupled metasurface and also shows a more detailed view of the optical receiver.

FIG. 4 shows a more detailed view of an optical integrated circuit chip 450 having an optical transmitter 140 including a coupled beam steering element 160. In an embodiment, the optical transmitter can include a VCSEL array 440 including one or more VCSELs and an overlying coupled optical metasurface layer 460 having metasurface elements which are configured (programmed) to steer an optical beam in a particular direction to another chip (not shown) at another location having an optical receiver for receiving the optic signal or optical beam.

In an embodiment, the chip 450 includes CMOS driver circuitry 475 (e.g., laser driving circuit that can include an amplifier, op-amps, microprocessor logic and/or transistor devices, circuits and conductors) physically and electronically connected to the VCSEL array using C4 material or like solder bump connections 480. The CMOS driver circuitry 475 is operable to generate electronic control signals used to drive an individual VCSEL of the VCSEL array 440 to trigger generation of an optical signal or optical beam in a direction normal (perpendicular) to the surface of the array. The CMOS driver circuitry 475 is further operable to generate control signals 490, e.g., voltages, that can be received at a metasurface input 495 to program and configure the metasurface layer 460 at the location of the VCSEL it is coupled with.

FIG. 4 further depicts a more detailed view of an optical receiver 120 having a photodetector array layer 412 which includes an array of photodetector elements 420 such as a photodiode or phototransistor that detects incident light. Signals received at an individual photodetector element 420 can be processed, e.g., amplified by a transimpedance amplifier 425 in an optical signal processing layer 430. Depending of the wavelength that is used for the optical communication the photodetector array layer 412 can include a photodiode array from III-V semiconductors such as GaAs, InGaAs, InP but can also be fabricated from Si or Ge diodes.

Figure 5A:
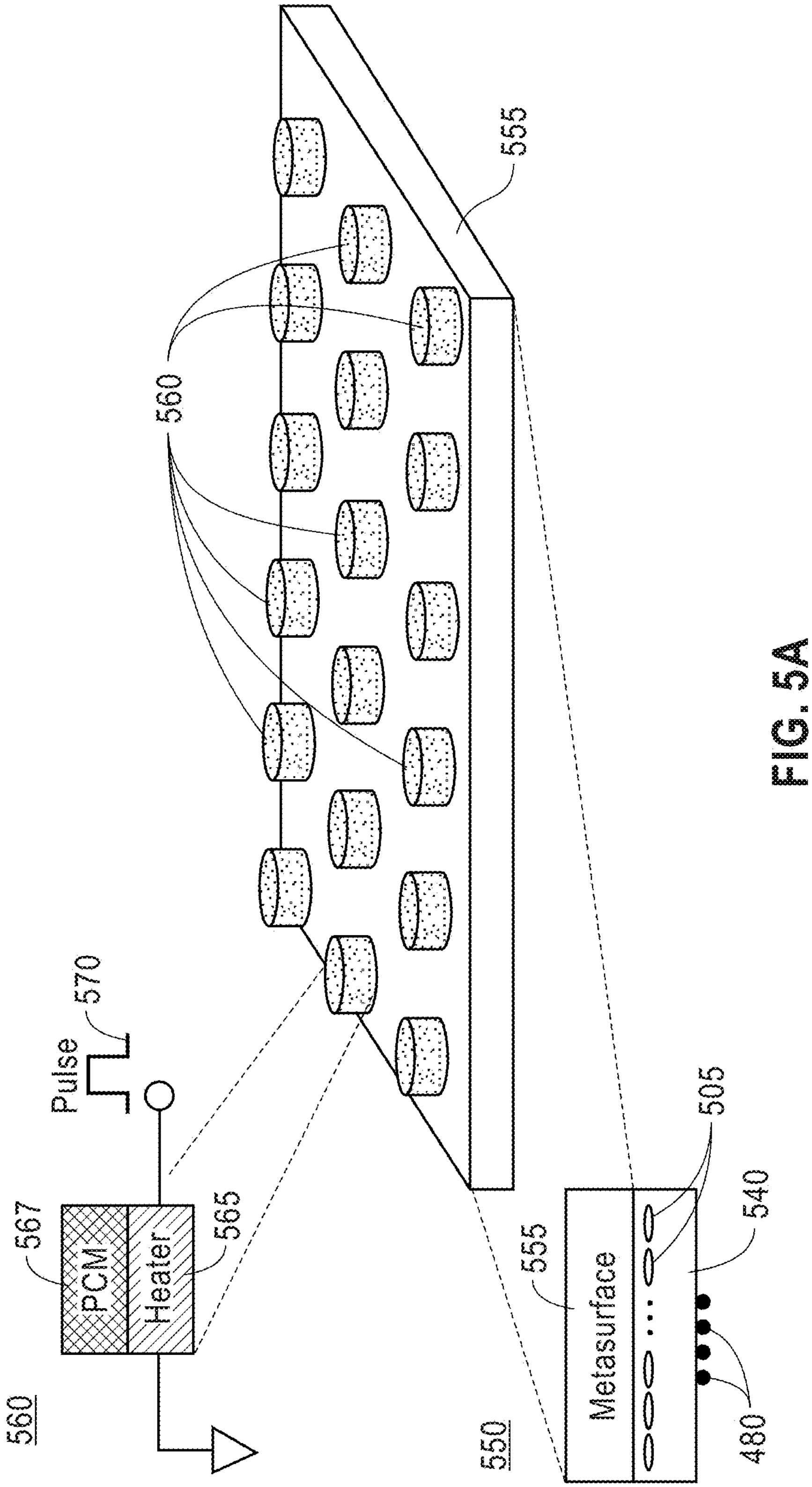
FIGS. 5A-5C depict an optical chip having an exemplary optical metasurface layer including a 2-dimensional layout of PCM elements formed on a substrate that perform an optical beam steering function based on their programmed state.

As shown in a detailed view of FIG. 5A, there is depicted an optical chip 550 illustrating an exemplary VCSEL array layer 540 including a 2-dimensional layout of VCSEL transmitter elements 505 formed on a substrate that are electrically connected to the C4 or like solder bump connections 480 to receive control and data signals from circuit drivers in an underlying integrated circuit (not shown) for generating optical beams. On top the VCSEL array 540 is formed an optical metasurface layer 555 consisting of an array of phase change material (PCM) elements 560. Over each underlying VCSEL, there may be formed many PCM elements 560 as these elements are subwavelength in size. In an embodiment, the optical metasurface PCM elements 560 includes layers of a chalcogenide phase change material that can undergo a thermally driven crystalline-to-amorphous phase transition. Such PCM layer material can be any material that undergoes a phase change from crystalline to amorphous or vice versa when energy is applied thereto whereby the electrical properties of the material also change. The PCM layer thickness can be 2 nm to 100 nm thick. The PCM elements 560 can comprise of a resistive heater (proximity heater element) 565 which is coupled to an overlying phase change material (PCM) structure 567. By electrically pulsing the resistive element 565 with a pulse 570, the PCM phase can be change from crystalline (c-PCM) to amorphous (a-PCM) and vice versa. As an example, a large current pulse with a short-trailing edge (i.e. abrupt change in current) will cause the PCM to melt quench leading to the formation of a-PCM. In another example, a lower current pulse 570 which does not melt the PCM, or a current pulse with a slow trailing edge will lead to crystallization of the PCM material, forming c-PCM. A pulse that causes the PCM to crystallize is referred to as SET pulse, while a pulse that causes the PCM to turn amorphous is called RESET pulse. We note that the PCM material can be tuned to intermediate states between fully crystalline or fully amorphous using intermediate programing current pulses 570.

Figure 5B:
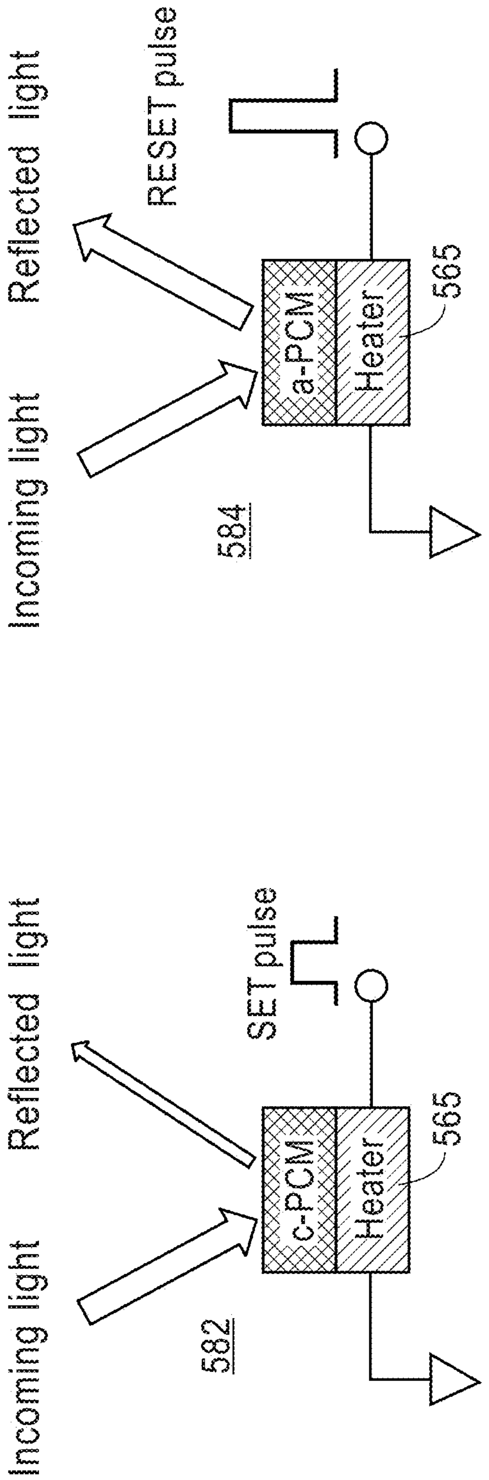

Referring to FIG. 5B there is depicted two PCM array elements 582, 585. The heater electrode 565 of PCM array element 582 is programed with a SET pulse to achieve the crystalline (c-PCM) phase. The crystalline PCM absorbs incoming light, so little light is returned/reflected by element 582. The heater electrode 565 of PCM array element 584 is programed with a RESET pulse to achieve the amorphous (a-PCM) phase. The amorphous PCM is nearly transparent to the incoming light, so the incoming light is fully reflected from the heater element (serving here as a mirror). The returned light from element 584 has therefore of similar intensity to the incoming light. Each of the PCM array elements 560 can be tuned independently as will be explained below. The above example relied on the change in the absorption of PCM to implement the metasurface function. In another example, the metasurface function can be achieved by the change of the refractive index of the PCM material. Similarly to the earlier example, the PCM material structure 567 in each element 560 can be programmed to a specific refractive index value by tuning the phase between fully crystalline to fully amorphous.

Figure 5C:
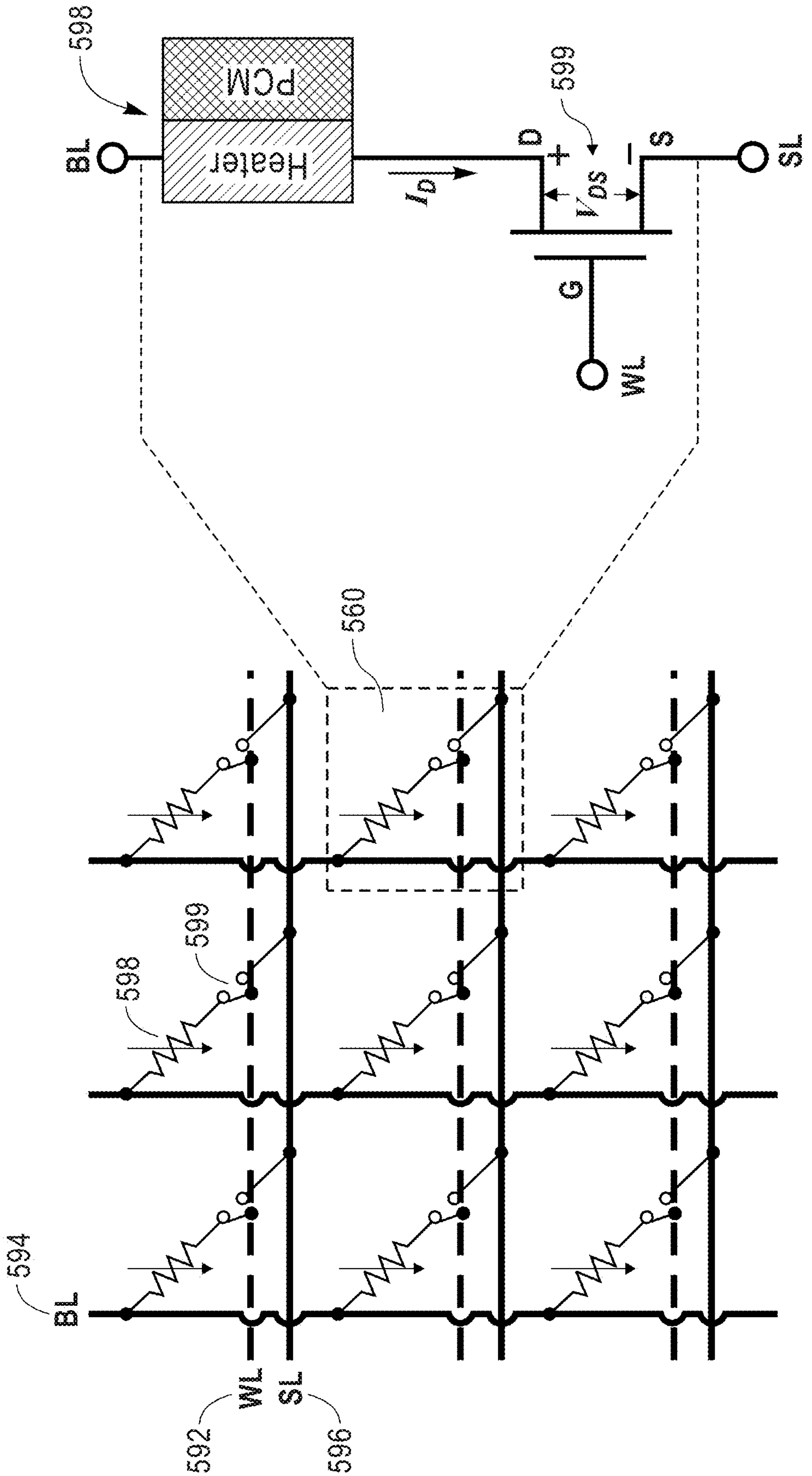

Referring to FIG. 5C, an array of PCM elements 560 is electrically connected in a memory like configuration, to enable unique individual programing of each of the elements 560. The array comprises of word lines (WL) 592, bit lines (BL) 594, and source lines (SL) 596. To address a specific element 598, a transistor 599 is enabled to provide a voltage at the corresponding WL which is connected to the transistor's gate. Element 598 is then programmed by applying a SET or RESET pulse to the BL. The pulse amplitude, duration and trailing edge can all be used to program the PCM at device 598 to any state between fully crystalline or fully amorphous.

In embodiments, the phase change material (PCM) that can be used for PCM metasurface layer 560 includes a chalcogenide that contains an element from Group 16 (i.e., a chalcogen) of the Periodic Table of Elements. Examples of chalcogens that can be used as the phase change material include, but are not limited to, Ge—Sb—Se—Te alloy (GSST), a GeSbTe alloy (GST), a SbTe alloy, or an InSe alloy. Other materials such as, for example, $Cr_2Ge_2Te_6$ (CrGeT), can also be used as the phase change material so long as this other material can retain separate amorphous and crystalline states. Alternatively, other suitable materials for the phase change material include Si—Sb—Te (silicon-antimony-tellurium) alloys, Ga—Sb—Te (gallium-antimony-tellurium) alloys, Ge—Bi—Te (germanium-bismuth-tellurium) alloys, In—Se (indium-tellurium) alloys, As—Sb—Te (arsenic-antimony-tellurium) alloys, Ag—In—Sb—Te (silver-indium-antimony-tellurium) alloys, Ge—In—Sb—Te alloys, Ge—Sb alloys, Sb—Te alloys, Si—Sb alloys, and combinations thereof. In some embodiments, the phase change material can further include nitrogen, carbon, and/or oxygen. Further optical PCM materials that can be used can be found in Zhang, Y., Chou, J. B., Li, J. et al. Broadband transparent optical phase change materials for high-performance nonvolatile photonics. *Nat Commun* 10, 4279 (2019). In the two different phases, both the resistivity and the index of refraction of the chalcogenide PCM is different. That is, a metasurface elements 560 including the chalcogenide PCM material can be tunable, i.e., programmed to have a first index of refraction in its amorphous phase and a second index of refraction different than the first index of refraction while in its crystalline phase. As shown in FIG. 5, based on these refractive differences, the angle of an incident optic beam from an individual VCSEL 500 can be re-directed or dynamically steered at an angle relative to an incident angle, e.g., at the vertical. That is, each PCM element's refractive index or absorption can be tuned separately and a metasurface array can be built using these PCM elements.

In an alternative embodiment, rather than use of the metasurface array, the coupled beam steering elements can be a micro-electro-mechanical systems (MEMS) array of structures and a MEMS structure(s), e.g. a cantilever, that can be dynamically reconfigured under the electrostatic force, e.g., induced by voltage input, thus altering the morphology or adjusting the distances between meta-atoms and their substrate. Unlike use of the metasurface that uses PCM elements and is therefore nonvolatile (i.e. it not required to maintain a voltage after programing the phase), most MEMS devices require to keep the voltage on or otherwise the device snaps back to its "ground state" (e.g., a state of the cantilever when no electrostatic force is applied to the device).

Referring back to FIG. 5A, the optical transmitter array 540 includes one or more VCSELs 505, each VCSEL in the array 540 being driven by a laser driver circuit (not shown). Both the VCSEL arrays 540 and the laser driver(s) can be bonded on a photonic chip (IC) or can be manufactured as part of the IC. The VCSEL arrays can be used to allow for parallel channels of communication with each VCSEL in the array coupled with a metasurface. In this manner, an optical chip can communicate with two or more (multiple) other optical chips simultaneously. The optical IC can be made of Si, and the VCSELs are made of III-V semiconductors (e.g. GaAs). As such the VCSEL chip can be made separately and bonded over the IC.

Figure 6:
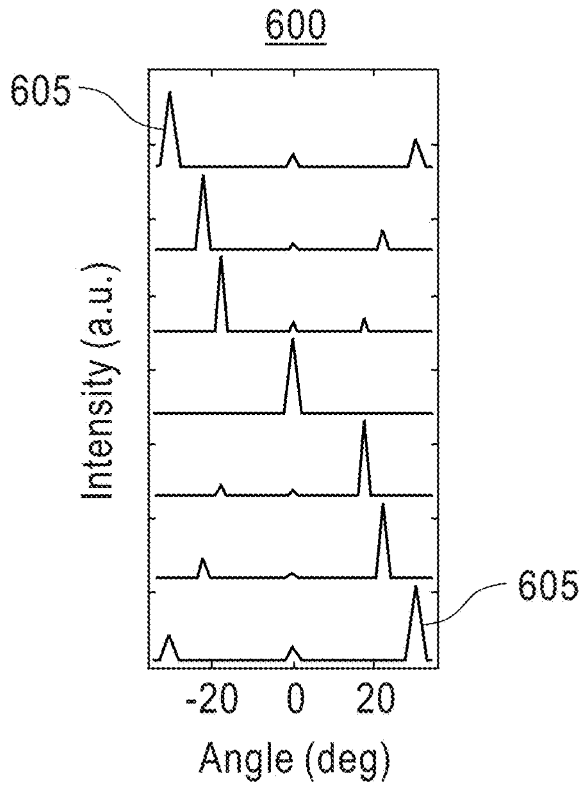
FIG. 6 depicts a series of plots with each plot illustrating the different optical beam signal intensities (Y-axis) of a transmitted optical signal at each of a plurality of angles relative to a vertical (angle at 0°)

FIG. 6 depicts a series of plots 600, each plot illustrating the different optical beam signal intensities (Y-axis) of a transmitted optical signal at each of a plurality of angles relative to a vertical (angle at 0°). As shown in FIG. 6. the metasurface layer of FIG. 5 is programmable to at least re-direct an incident VCSEL optical beam within a range between −20° to +20° based on the programming of the chalcogenide PCM material of metasurface layer 560 and further depicts the increased intensity 605 of an optical beam at a respective programmed angle.

In a method of operating the VCSELs (optical transmitters) of photonic ICs that communicate signals received at optical receivers at other optical chips in a package, the VCSEL array and metasurface layers are dynamically programmed to achieve optimal communication according to determined optical beam steering parameters (optical beam parameters). That is, in an initial implementation, under control of a logic or control circuit such as a programmed microprocessor, each VCSEL of a VCSEL array and corresponding coupled metasurface element of the metasurface layer can be first operated to enable optical beam communication with another chip of the optical chip package to determine optimal beam parameters for that specific chip-to-chip communication.

For each potential chip-to-chip communication, the optical beam parameters are determined that optimize chip-to-chip alignment that maximizes the optical power of the received optical beam signal at the optical receiver of the receiving photonic IC. For example, in the exemplary semiconductor package shown in FIG. 2, given a first chip 250 on tier 210A that is programmed to communicate with a further chip, e.g., chip 250A on second tier 210B, the optical beam parameters are determined such that the transmitted optical beam 230 is aligned for optimal transmission and receipt at a receiver 120 of that chip 250A. Similarly, for the same first chip 250 programmed to communicate with a further chip, e.g., chip 250B, the optical beam parameters are determined such that the transmitted optical beam 230 is aligned for optimal transmission and receipt at a receiver 120 of that chip 250B. This process can repeat until, for example, the first chip 250 is programmed to communicate with a further chip, e.g., chip 250N, in order to determine the optimum optical beam parameters such that the transmitted optical beam 230 can be optimally received at a receiver 120 of that chip 250N. This process includes determining optical beam parameters for each type of chip-to-chip optical communication contemplated. In a non-limiting embodiment, the optimal beams steering parameters can consist of voltages/current applied to the VCSEL and coupled metasurface layer elements, or values of any other external electrical or mechanical stimuli that can be controlled to configure the optimum beam steering angle in the metasurface element coupled to the VCSEL transmitter to optimize the alignment of the transmitted/received optical beam for maximal power transfer.

In an embodiment, a method is implemented such that after mounting chips on the PCB or like substrate, beam alignment between $chip_N$ and $chip_K$ is optimized and the optimal beam steering parameters are recorded in a table. Thus, in operation, when data transfer between $chip_N$ and $chip_K$ is needed, beam steering parameters are loaded to $chip_N$ meta surface to direct the optical beam to $chip_K$. If $chip_N$ has more than one optical emitter, and $chip_K$ has more than one receiver communication can take place in parallel links. The process of determining optimal beam steering parameters is repeated for each-chip to-chip communication in the package. A programmed processor can build a table or matrix to record for each possible chip-to-chip communication a series of beam steering parameters that can be applied for a respective optimal chip-to-chip communication.

Figure 7:
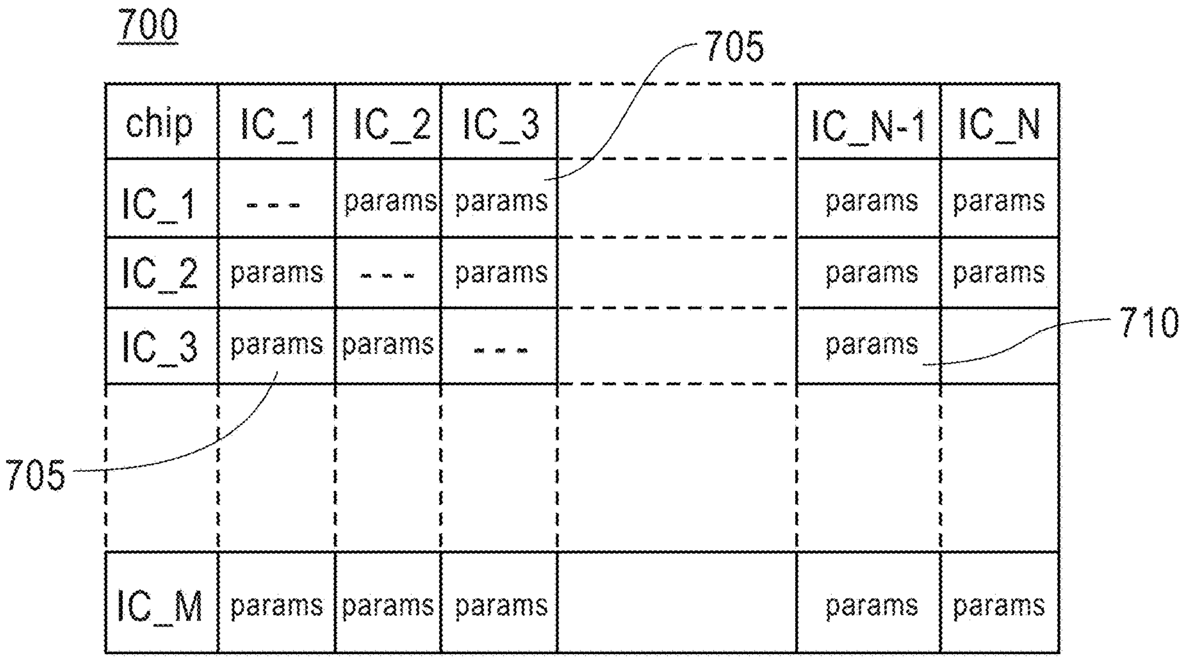
FIG. 7 depicts an exemplary electronic record consisting of a matrix having optimal optical beam steering parameters that are used to program a VCSEL of the optical transmitter array and corresponding coupled metasurface element for providing optimal optical chip-to-chip communication between any two conceivable chips in the semiconductor chip package such as shown in FIGS. 1-3.

FIG. 7 depicts an exemplary electronic record consisting of a table 700 having optimal optical beam steering parameters 705 that are used to program a VCSEL and metasurface element of the optical transmitter array and corresponding coupled metasurface element for providing optimal optical chip-to-chip communication between any two conceivable chips (e.g., labeled chips IC_1, IC_2, . . . IC_M, . . . IC_N) in the semiconductor chip package such as shown in FIGS. 1-3. In FIG. 7, for an optical semiconductor package, table 700 shows the optical chips along a row and optical chips along a column that can communicate with each other according to embodiments herein. At each intersection, corresponding to any two communicating optical chips, there is the listing of beam steering parameters for optimal optical beam communication. For example, chip IC_3 will optimally communicate with chip IC_N-1 by programming the VCSEL optical transmitter and metasurface element at IC_3 according to beam steering parameters 710 accessed in the table 700. Referring to the example where the metasurface elements 560 comprise a PCM layer coupled to a proximity heater, the beam steering parameters would inform the correct pulse amplitude and pulse shape needed to program each element 560 to achieve an optimal angle for directing the transmitted optical beam for maximum power transfer at the receiving chip. In yet another example, when the metasurface comprise of MEMS elements, the beam steering parameters would inform the voltages that should be applied to the cantilever mirror elements to direct the optical beam to achieve maximum power at the receiver chip. Thus, in an embodiment, a method is implemented that can establish a network of optical links using a plurality of chips mounted on a board. The chip-to-chip alignment is optimized by finding a set of steering beam parameters that optimized the optical power at the receiving chip. Given the configurability of the beam steering elements, a network configuration can change on the fly. Further, VCSEL arrays can provide a large number of optical interconnects per chip. The data transfer rates (bit/s) can exceed copper connections for centimeter distances and there is no need for repeaters.

As used herein, the term “processor” may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a “processor”, may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. An apparatus comprising:

a plurality of optical integrated circuits (IC) disposed on a support substrate, each optical IC having an optical transmitter and an optical receiver, the optical transmitter configured to transmit an optical signal;

a beam steering element coupled to said optical transmitter and configurable to change a direction of a transmitted optical signal;

a structure facing the plurality of optical ICs providing a light reflective surface;

the beam steering element directing a transmitted optical signal from a first optical IC towards the reflective surface in a direction that is reflected at said light reflective surface for receipt at an optical receiver at any one of the plurality of optical ICs.

2. The apparatus of claim 1, wherein the optical transmitter comprises a vertical-cavity surface emitting laser device.

3. The apparatus of claim 1, wherein the beam steering element is a metasurface.

4. The apparatus of claim 1, wherein the beam steering element is a MEMS device.

5. The apparatus of claim 1, further including: a processor device configured to generate one or more control signals for receipt at a beam steering element, the one or more control signals configuring the beam steering element to direct a transmitted optical signal to optimize a power of the transmitted optical signal received at an optical receiver of the first optical IC or the second optical IC.

6. The apparatus of claim 5, wherein the plurality of optical ICs are configurable as a optical communications network for transferring data between one or more optical ICs, said apparatus further comprising:

a table having entries, each entry for mapping one or more beam steering parameters used for optimally transferring data between a specific pair of optical ICs, said hardware processor generating control signals based on the beam steering parameters of an entry in said table, said control signals configuring the beam steering element for optimally transferring data between said specific pair of optical ICs.

7. An apparatus comprising:

a first support substrate supporting a first plurality of optical integrated circuits (IC);

a second support substrate facing said first support substrate, said second support substrate supporting a second plurality of optical integrated circuits (IC), each optical IC of said first plurality and second plurality of optical ICs having an optical transmitter and an optical receiver, the optical transmitter configured to transmit an optical signal;

a beam steering element coupled to said optical transmitter of each optical IC of said first plurality and second plurality of optical ICs and configurable to change a direction of a transmitted optical signal, the beam steering directing a transmitted optical signal from a first optical IC of said first plurality of optical ICs for receipt at an optical receiver at an optical receiver at any one of the second plurality of optical ICs.

8. The apparatus of claim 7, wherein the optical transmitter comprises a vertical-cavity surface emitting laser device.

9. The apparatus of claim 7, wherein the beam steering element is a metasurface.

10. The apparatus of claim 7, wherein the beam steering element is a MEMS device.

11. The apparatus of claim 7, further including: a processor device configured to generate one or more control signals for receipt at the beam steering element, the one or more control signals configuring the beam steering element to direct a transmitted optical signal to optimize a power of the transmitted optical signal received at an optical receiver of the second optical IC or the third optical IC of the second plurality of optical ICs.

12. The apparatus of claim 11, wherein the plurality of optical ICs are configurable as a optical communications network for transferring data between one or more optical ICs, said apparatus further comprising:

a table having entries, each entry for mapping one or more beam steering parameters used for optimizing the transferred data between a specific pair of optical ICs, said hardware processor generating control signals based on the beam steering parameters of an entry in said table, said control signals configuring the beam steering element for optimally transferring data between said specific pair of optical ICs.

13. An apparatus comprising:

multiple support substrates defining an enclosed space, each support substrate supporting a respective plurality of optical integrated circuits (IC), each optical IC of each said respective plurality of optical ICs having an optical transmitter and an optical receiver, the optical transmitter configured to transmit an optical signal;

a beam steering element coupled to said optical transmitter of each optical IC of each said respective plurality of optical ICs and configurable to change a direction of a transmitted optical signal, the beam steering element directing a transmitted optical signal from a first optical IC of a first plurality of optical ICs for receipt at an optical receiver at any one of the respective plurality of optical ICs.

14. The apparatus of claim 13, wherein the multiple support substrates defining an enclosed space are configured as a polygon, a respective plurality of optical integrated circuits (IC) disposed on a respective side of the polygon.

15. The apparatus of claim 14, wherein the polygon is a pentagon, a hexagon, or an octagon.

16. The apparatus of claim 13, wherein the optical transmitter comprises a vertical-cavity surface emitting laser device.

17. The apparatus of claim 13, wherein the beam steering element is a metasurface.

18. The apparatus of claim 13, wherein the beam steering element is a MEMS device.

19. The apparatus of claim 13, further including: a processor device configured to generate one or more control signals for receipt at the beam steering element, the one or more control signals configuring the beam steering element to direct a transmitted optical signal to optimize a power of the transmitted optical signal received at an optical receiver of the second optical IC or the third optical IC of the second plurality of optical ICs.

20. The apparatus of claim 19, wherein the plurality of optical ICs are configurable as a optical communications network for transferring data between one or more optical ICs, said apparatus further comprising:

a table having entries, each entry for mapping one or more beam steering parameters used for optimizing the transferred data between a specific pair of optical ICs, said hardware processor generating control signals based on the beam steering parameters of an entry in said table, said control signals configuring the beam steering element for optimally transferring data between said specific pair of optical ICs.

* * * * *